United States Patent Office 3,729,436
Patented Apr. 24, 1973

3,729,436
PROCESSABLE FLAME RESISTANT ABS-PVC BLENDS
Wendell O. Phillips, Stow, Ohio, assignor to The General Tire & Rubber Company, Akron, Ohio
No Drawing. Filed Oct. 6, 1971, Ser. No. 187,102
Int. Cl. C08d 9/08
U.S. Cl. 260—23.7 M          9 Claims

ABSTRACT OF THE DISCLOSURE

Processable blends of ABS polymers and PVC polymers in weight ratios of 50:50 to 40:60 are rendered non-burning by the incorporation of at least 2 parts by weight per 100 parts by weight of total polymers of chromium salts of carboxylic acids containing from 2 to 20 carbon atoms. Significant flame resistance results from the incorporation of such chromium salts in blends of ABS and PVC polymers in weight ratios as high as 60:40.

BACKGROUND OF THE INVENTION

Blends of acrylonitrile-butadiene-styrene terpolymers, generally referred to as ABS polymers, and vinyl chloride polymers, generally referred to as PVC, have come into substantial commercial use in blow molding and vacuum forming such products as power tool housings and aircraft wall panels. Efforts have been made to render such blends flame-resistant using a wide variety of metal oxides, the preferred metal oxide being antimony trioxide, which has long been used as a fire retardant for plastic materials especially in the presence of halogen donors such as polyvinyl chloride. It has been found that blends of ABS polymers and PVC in weight ratios of 30:70 and less have a natural resistance to flame without any additives, but such blends are very difficult to form or otherwise process. Blends of ABS polymers and PVC polymers in approximately equal weights have excellent processability, but they have no significant flame resistance. Even with most of the metal oxides normally used to impart flame resistance, these blends are at best self-extinguishing.

SUMMARY OF THE INVENTION

This invention comprises compositions of matter which are blends consisting essentially of (A) ABS type polymers and (B) PVC type polymers in weight ratios of from about 60:40, preferably about 50:50, to 40:60 containing at least about 2, preferably about 5, parts by weight per 100 parts by weight of total polymers of chromium salts of carboxylic acids containing from 2 to 20 carbon atoms per molecule.

More specifically, the compositions of this invention are blends consisting essentially of (A) terpolymers of monomers of which 20 to 40 weight percent is butadiene-1,3 and/or isoprene, 15 to 35 weight percent is acrylonitrile and/or methacrylonitrile, and 35 to 55 weight percent is styrene and/or alphamethylstyrene, (B) chlorinated saturated aliphatic hydrocarbon polymers containing on average of from about 0.4 to about 1 chlorine atom per carbon atom, components (A) and (B) being in a weight ratio from about 60:40 to 40:60 and (C) chromium salts of mono- and polycarboxylic acids containing from 2 to 20 carbon atoms per molecule in an amount of at least about 2 parts by weight per 100 parts by weight of total polymers (A) and (B). There are preferably as a practical matter no more than about 20 parts by weight of chromium salts per 100 parts of total polymers (A) and (B). Materials such as compounding and processing aids and other additives may also be present.

DESCRIPTION OF THE PREFERRED EMBODIMENT

The ABS terpolymers (A) employed in the blends of this invention are preferably terpolymers prepared from monomers of which 20 to 40 weight percent, preferably about 30 weight percent, is butadiene-1,3, 15 to 35 weight percent, preferably about 25 weight percent, is acrylonitrile and 35 to 55 weight percent, preferably about 45 weight percent, is styrene. The usual variation in monomers which can be and are employed in ABS type polymers generally can also be employed in the ABS type polymers employed in this invention. These terpolymers are thermoplastic vacuum-formable resins having excellent solvent resistance and excellent heat distortion characteristics.

In order to be of use in this invention the terpolymers should have a heat distortion temperature in the range of about 195° to 245° F., preferably about 199° to 220° F. The ABS type polymers can be terpolymers of the type described generally in U.S. Pat. No. 3,367,997 or can be graft copolymers of the type described in U.S. Pat. No. 2,802,809. Presently available commercial ABS polymers are designated for use with PVC polymers.

The PVC type polymers (B) employed in the blends of this invention are preferably homopolymers or copolymers of vinyl chloride and/or vinylidene chloride. Such polymers include, for example, homopolymers of vinyl chloride, homopolymers of vinylidene chloride, copolymers of vinylidene chloride and vinyl chloride, equivalent chlorinated hydrocarbons and copolymers of vinyl chloride and ethylenically unsaturated monomers copolymerizable therewith such as vinylidene bromide, ethylene, propylene, isobutylene, allyl acetate, allyl chloride, vinyl acetate, acrylonitrile, styrene and moleic, fumaric and acrylic acid esters. Such polymers are described more fully in the aforementioned U.S. Pat. No. 2,802,809. For the purpose of this invention the PVC type polymers employed herein should contain at least 0.4 chlorine atom per carbon atom, preferably about 0.5 to 0.7 chlorine atom per carbon atom, but no more than about one chlorine atom per carbon atom.

The PVC type polymers employed in the blends of this invention are preferably finely divided (powder having a maximum dimension ranging from about 0.0001 to 2 mm.) and have an intrinsic viscosity of from about 0.25 to 2.5, preferably from about 0.5 to 1.5. These polymers can be made by bulk, solvent, emulsion or suspension polymerization processes, preferably the suspension polymerization process.

The chromium salts of carboxylic acids (C) employed in the blends of this invention are generally powdery solids which are readily dispersible in the claimed blends of polymeric components (A) and (B). As a practical matter, they are usually finely divided particles that will pass through a 200 mesh screen (U.S. Sieve Series).

The chromium salts can be of the chromic or the chromous variety as both will operate successfully herein. Generally, however, the commercially available grades of chromium salts are mixtures of both chromic and chromous salts, and this latter designation is lost, especially in the higher molecular weight carboxylic acid series.

The carboxylic acid can be saturated or unsaturated and monocarboxylic or polycarboxylic. Examples of these acids include acetic acid, oxalic acid, stearic acid and oleic acid. From a practical standpoint, the acid should contain less than 20 carbon atoms per molecule as higher series acid salts utilize less chromium per total molecular weight thus requiring excessive amounts of salt to be effective as a fire retardant. Also, mixtures of different chromium salts are contemplated herein and may find use in special applications.

The weight ratio of component (A) to component (B) is preferably as low as possible, but for the purposes of this invention the weight ratio must be at least about 40:60 to give a polymer blend having satisfactory processability and vacuum formability. Such blends have a natural resistance to burning, but at least about 2 parts by weight of chromium salt per 100 parts of total (A) and (B) are necessary to reduce burn time to zero by the test method employed. As the weight ratio of component (A) to component (B) increases, more chromium salt is required to maintain resistance to burning of the total blend. The maximum weight ratio of (A) to (B) is about 50:50 and, for the purposes of this invention, this ratio is preferred. However, significant flame resistance is possible with weight ratios as high as 60:40. The maximum amount of chromium salts that satisfies the objects of this invention is a practical limitation, 20 parts by weight of chromium salt per 100 parts of total (A) and (B) being a reasonable upper limit.

In addition to components (A), (B) and (C) the blends of this invention may contain up to about 6 weight percent of the total blend of additional ingredients, such as stearic acid in amounts of about 0.5 to 1.5 parts by weight per 100 parts of polymer and barium-cadmium (or other type) heat stabilizer in amounts of about 1.0 to 4.5 parts by weight per 100 parts of polymer. Other components such as fillers, pigments, blowing agents, tackifiers and plasticizer are also contemplated herein.

The compositions of this invention are useful for blow molding or vacuum forming power tool housings, aircraft wall panels, containers and the like.

The following examples are illustrative of the best presently-known methods of practicing the subject invention and are not intended to limit the invention, the scope of which is properly delineated in the claims. All quantitative measurements are in parts by weight unless otherwise noted.

EXAMPLE I

In this example the polymeric components were:

(A) a high impact ABS polymer within the parameters above sold commercially under the mark Kralastic 3100 by Uniroyal Corp. for use as a modifier for PVC polymers, and (B) polyvinyl chloride having an intrinsic viscosity of 1.03.

A dry blend of 50 parts of component (A), 50 parts of component (B), 1 part of stearic acid processing aid and 1.5 parts of a barium-cadmium heat stabilizer was prepared and mixed until completely homogeneous. Separate samples of this blend were blended in a Waring Blendor with 5 parts per 100 parts of total polymer of various metal compounds to effect homogeneity and then were milled and pressed into sheets and subjected to a standard oxygen index evaluation (ASTM D–2863–1970). The results appear below in Table I.

TABLE I

| Metal compound: | Oxygen index |
|---|---|
| None (Control) | 25.7 |
| Potassium acetate | 23.7 |
| Cupric acetate | 27.5 |
| Barium acetate | 25.2 |
| Zinc acetate | 27.1 |
| Aluminum acetate | 25.6 |
| Lead acetate | 24.8 |
| Manganese acetate | 27.2 |
| Chromium acetate | 30.6 |
| Zinc stearate | 28.9 |
| Lead stearate | 24.7 |
| chromium stearate | 32.5 |

This example shows that chromium acetate and chromium stearate impart significant fire retardancy to the ABS/PVC blend (higher oxygen index) than do other metal salts of the same carboxylic acids.

EXAMPLE II

Example I was repeated except that other metal compounds were used and an ASTM D–635 Horizontal Burn Test performed on the samples. The results appear below in Table II.

TABLE II

| Metal compound (parts per 100 parts total polymer) | Oxygen index | Average burn time after 2-30 second ignitions (seconds) | Burn length (inches) |
|---|---|---|---|
| Chromium acetate (5 parts) | 30.6 | 5 | <1 |
| Chromium oxalate (5 parts) | 30.1 | 7 | <1 |
| Chromium stearate (5 parts) | 32.5 | 18 | <1 |
| Chromium oleate (5 parts) | 31.8 | 12 | <1 |
| None | 25.7 | 30 | <1 |

Although not as stringent a test as Method 5903, Federal Test Method Standard No. 191, Vertical Flame Test, 12 Second Ignition, this example shows that chromium salts of carboxylic acids containing from 2 to 20 carbon atoms per acid molecule provide significant fire retardancy to 50/50 blends of ABS and PVC resins.

EXAMPLE III

Various blends of ABS and PVC resins with various amounts of chromium acetate added thereto were prepared and pressed into sheets in accordance with the procedure described in Example I, and the pressed sheets were tested for flammability using Method 5903, Federal Test Method Standard No. 191, Vertical Flame Test. The results are shown below in Table III.

TABLE III

| ABS/PVC ratio | Chromium acetate (parts per 100 parts of polymer blend) | Burn length (inches) | Burn time (seconds) | Rating [1] |
|---|---|---|---|---|
| 50/50 | 0 | 12 | 121 | B |
|  | 1 | 12 | 88 | B |
|  | 2 | 6 | 49 | SE |
|  | 4 | 2 | 2 | NB |
|  | 8 | 2 | 2 | NB |
|  | 12 | 3 | 7 | NB |
|  | 16 | 6 | 35 | SE |
|  | 20 | 7 | 56 | SE |
| 40/60 | 0 | 6 | 0 | SE |
|  | 2 | 7 | 0 | SE |
|  | 3 | 7 | 0 | SE |
|  | 4 | 7 | 0 | SE |
|  | 8 | 6 | 0 | NB |
|  | 12 | 6 | 3 | SE |
|  | 16 | 6 | 0 | SE |

[1] 12-second ignition used with 50/50 ABS/PVC blend and 60-second ignition used with 40/60 ABS/PVC blend.

NOTE.—Burnable (B); Self Extinguishing (SE); Non Burnable (NB).

What is claimed is:

1. A homogeneous blend consisting essentially of:
   (A) acrylonitrile-butadiene-styrene terpolymers having a heat distortion temperature in the range of about 195° to 245° F.,
   (B) chlorinated, saturated aliphatic hydrocarbon polymers containing an average of from about 0.4 to about 1 chlorine atom per carbon atom and having an intrinsic viscosity of from about 0.25 to 2.5,
   components (A) and (B) being in a weight ratio from about 60:40 to 40:60, and
   (C) at least 2 parts by weight per 100 parts by weight of total components (A) and (B) of chromium salts of aliphatic carboxylic acids containing from 2 to 20 carbon atoms per acid molecule.

2. A blend in accordance with claim 1 wherein the acrylonitrile-butadiene-styrene terpolymers in component (A) are prepared from monomers of which 20 to 40 weight percent is butadiene-1,3 and/or isoprene, 15 to 35 weight percent is acrylonitrile and/or methacrylonitrile and 35 to 55 weight percent is styrene and/or alpha-methylstyrene.

3. A blend in accordance with claim 2 wherein the polymers of component (B) contain an average of from about 0.5 to 0.7 chlorine atom per carbon atom.

4. A blend in accordance with claim 3 wherein the polymers of component (B) have an intrinsic viscosity of from about 0.5 to 1.5.

5. A blend in accordance with claim 4 wherein the polymers of component (A) have a heat distortion temperature in the range of about 199° to 220° F.

6. A blend in accordance with claim 5 wherein the polymers of component (B) consist essentially of polyvinyl chloride.

7. A blend in accordance with claim 6 wherein the weight ratio of components (A) and (B) is a maximum of about 50:50.

8. A blend in accordance with claim 5 wherein the chromium salt (C) is present in an amount no greater than about 20 parts by weight per 100 parts by weight of total components (A) and (B).

9. A blend in accordance with claim 8 wherein components (A), (B) and (C) comprise at least 94 weight percent of the total blend.

References Cited

UNITED STATES PATENTS

| | | | |
|---|---|---|---|
| 2,802,809 | 8/1957 | Hayes | 260—876 |
| 3,367,997 | 2/1968 | Smith | 260—891 |
| 3,641,208 | 2/1972 | Hall et al. | 260—876 |

DONALD E. CZAJA, Primary Examiner

E. C. RZUCIDLO, Assistant Examiner

U.S. Cl. X.R.

260—23 XA, 23.7 N, 45.75 R, 891, DIG. 24